May 13, 1958 H. H. GORRIE ET AL 2,834,362
FLUID PRESSURE RELAY VALVE MEANS
Filed Jan. 4, 1954 9 Sheets-Sheet 3
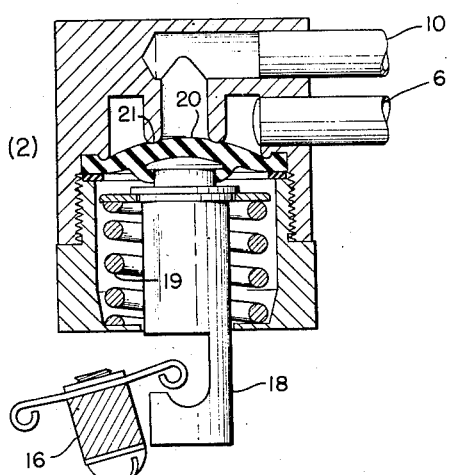
FIG. 4
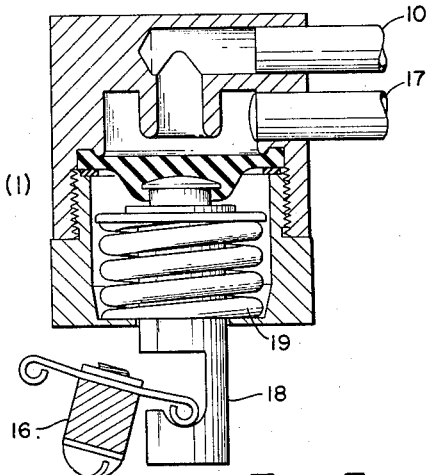
FIG. 5
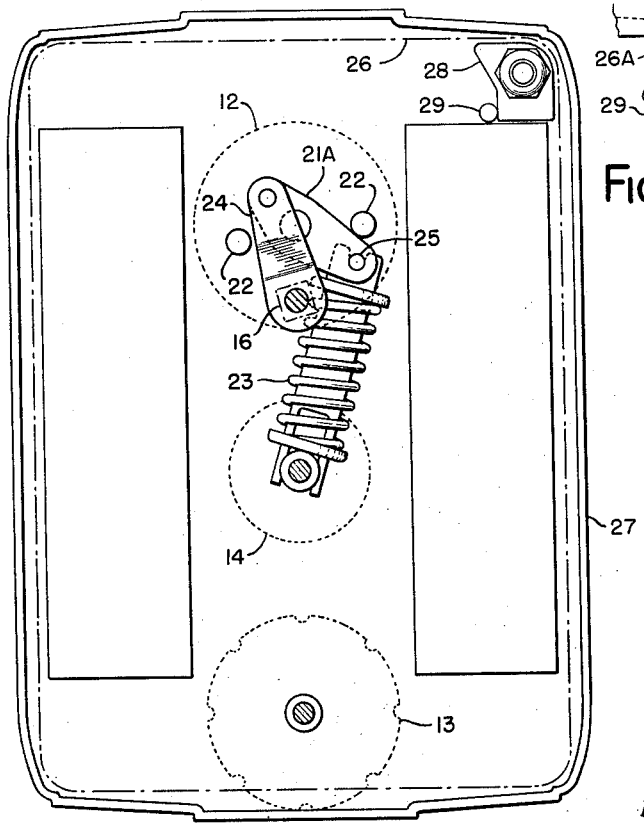
FIG. 6
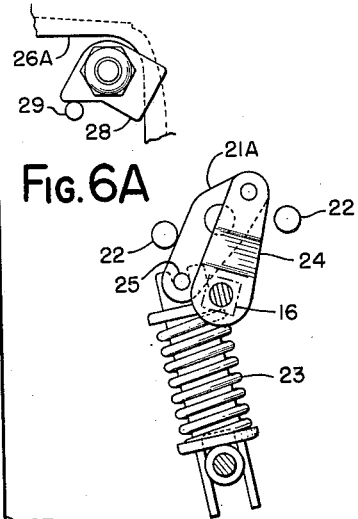
FIG. 6A
FIG. 7
INVENTORS
HARVARD H. GORRIE
JACK F. SHANNON
BY AND MICHAEL PANICH
Raymond W. Junkins
ATTORNEY

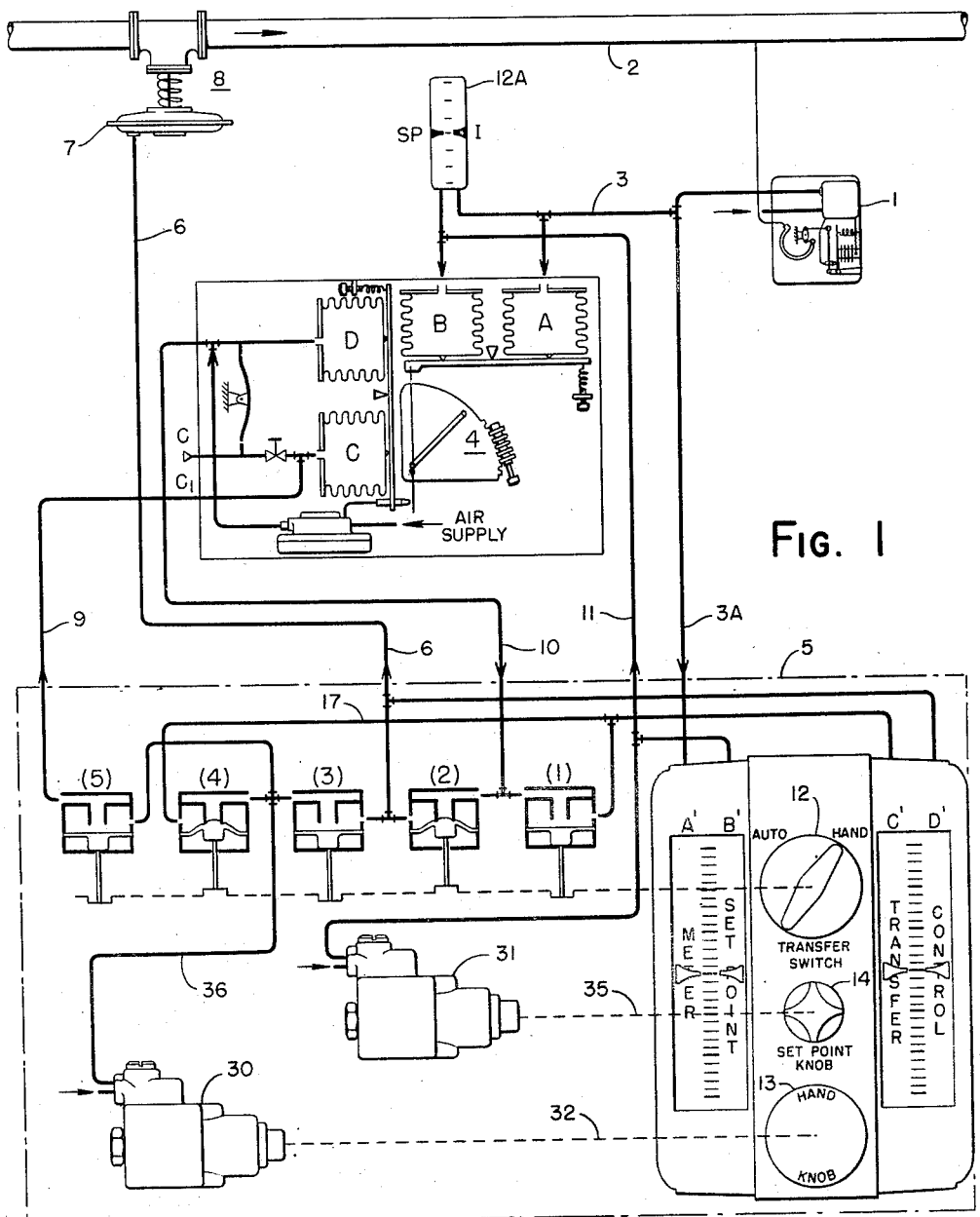

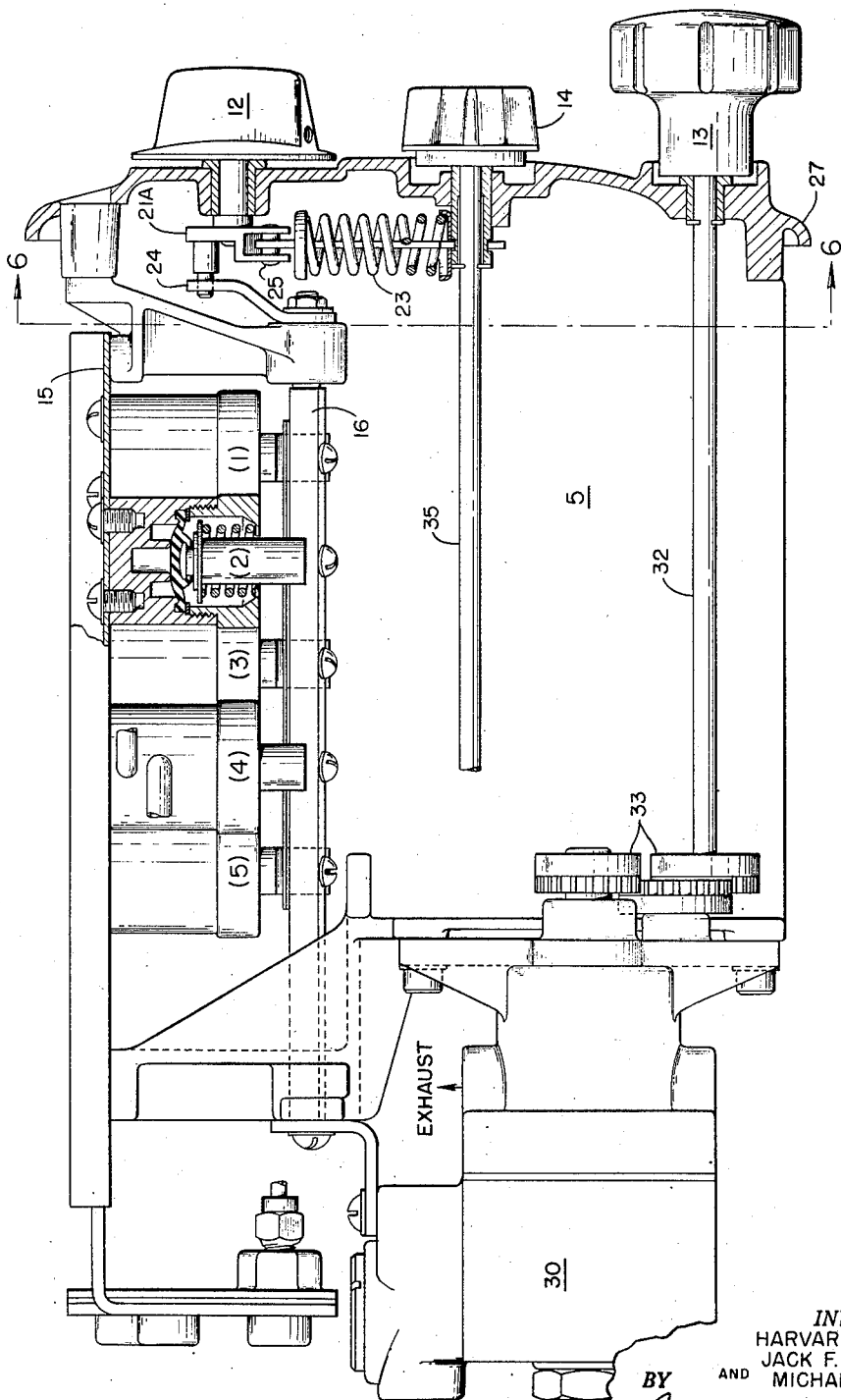

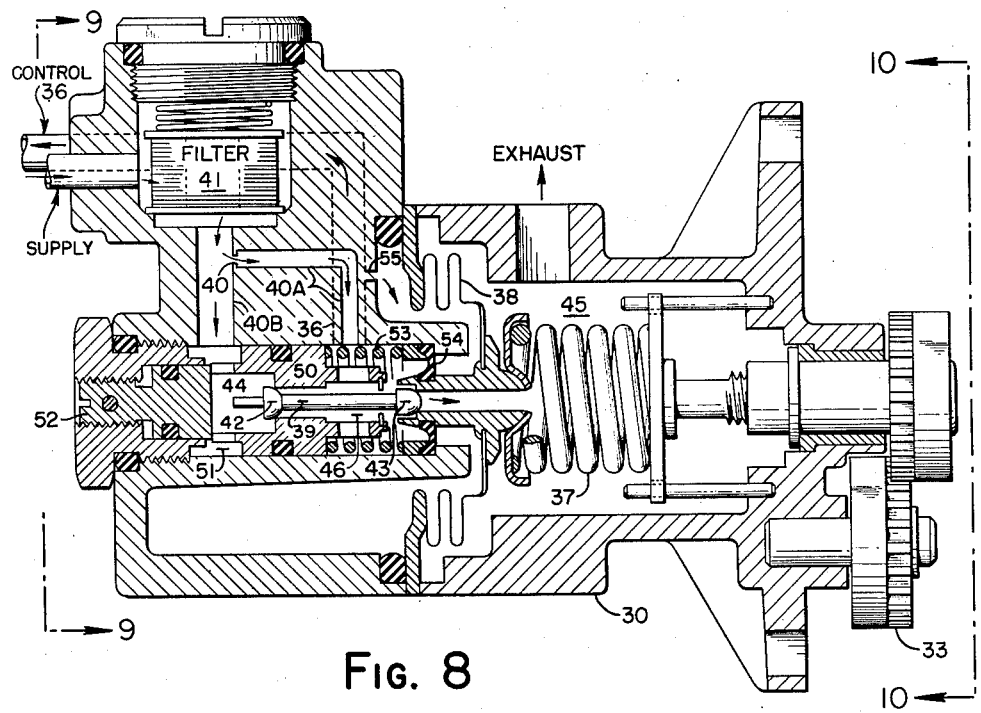
FIG. 8
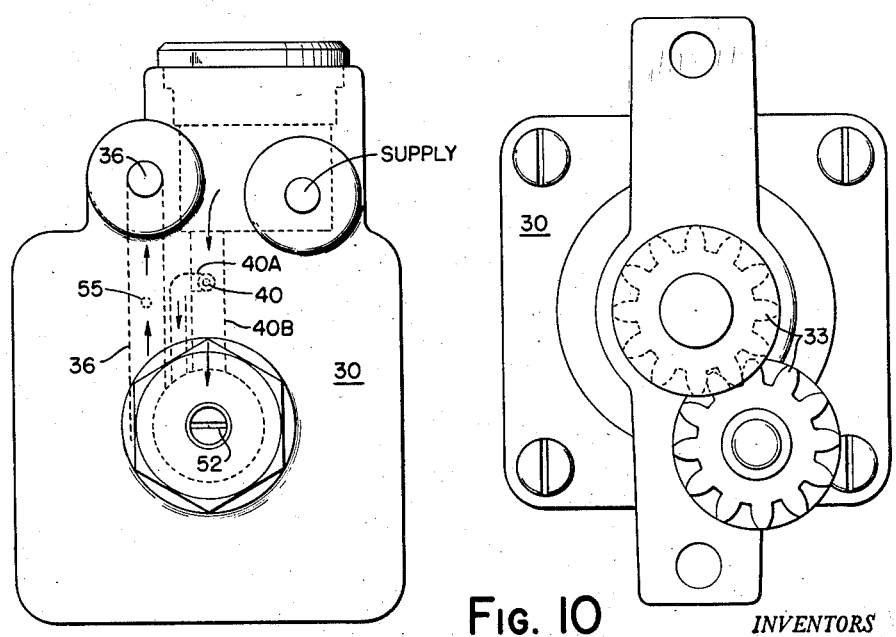
FIG. 9
FIG. 10
INVENTORS
HARVARD H. GORRIE
JACK F. SHANNON
AND MICHAEL PANICH
BY Raymond W. Jenkins
ATTORNEY

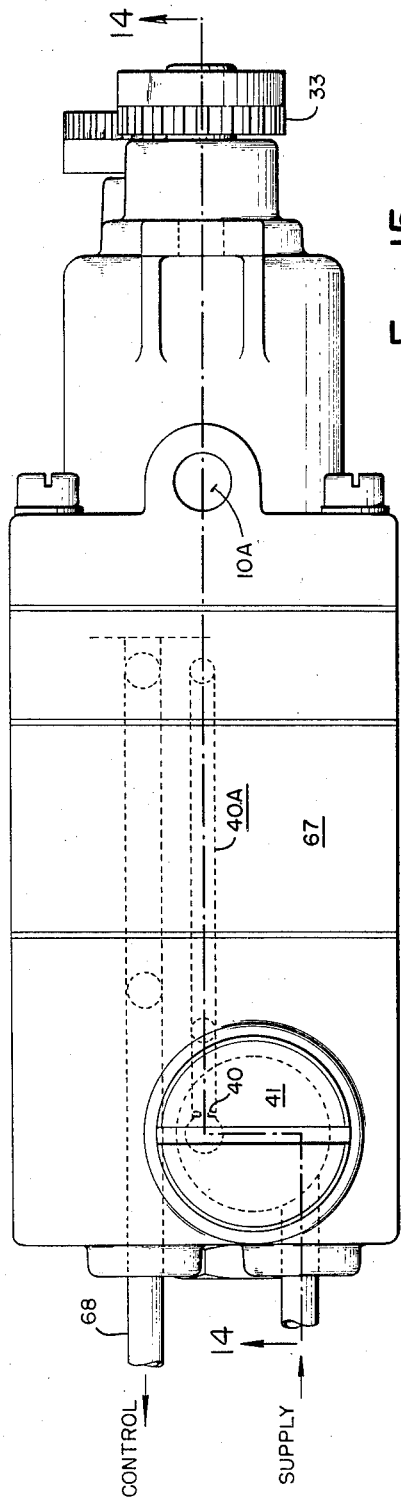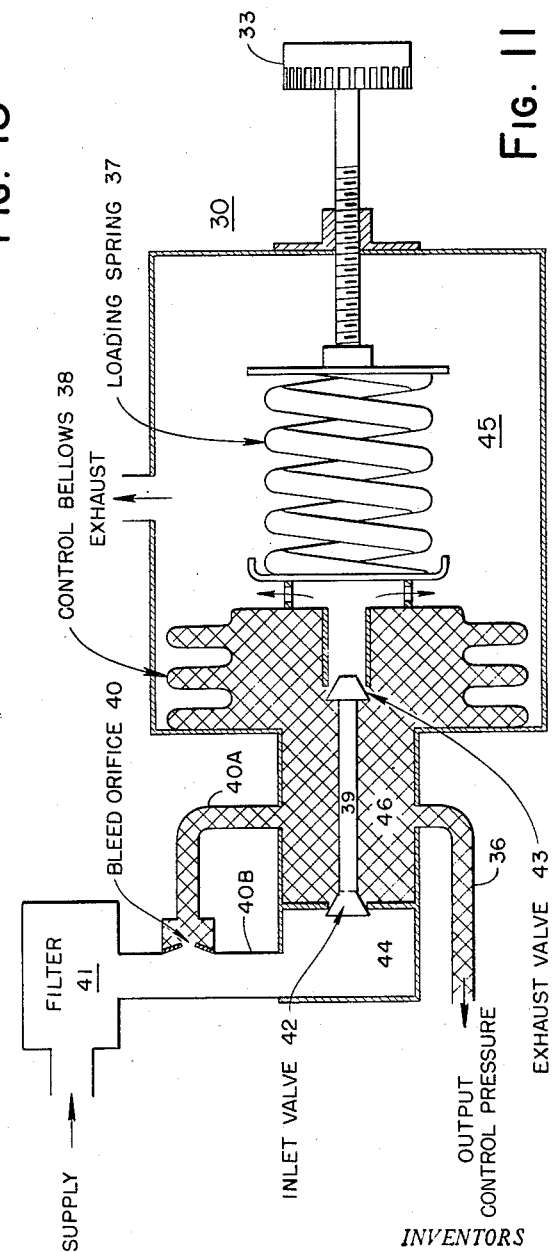

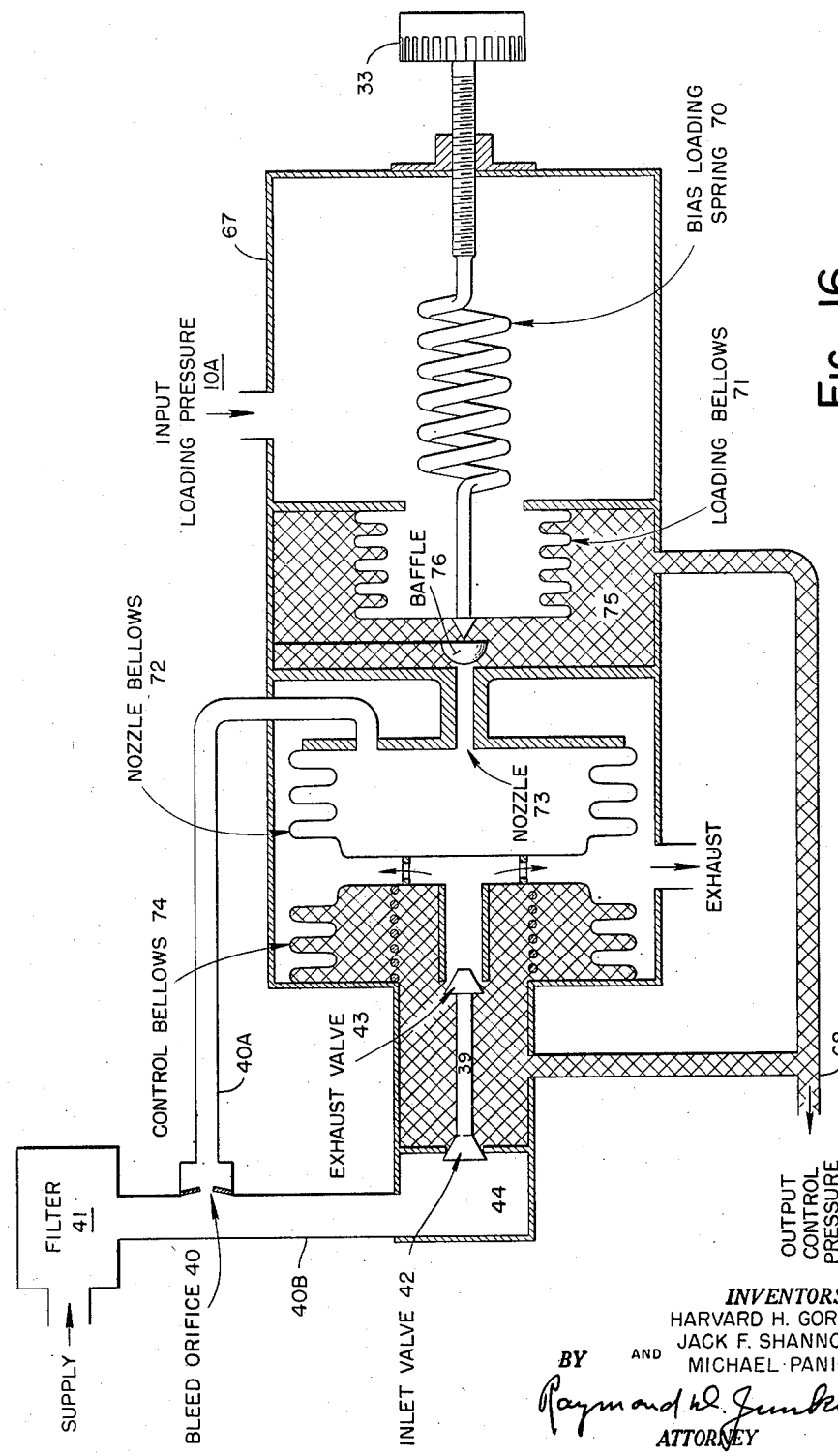

United States Patent Office 2,834,362
Patented May 13, 1958

2,834,362

FLUID PRESSURE RELAY VALVE MEANS

Harvard H. Gorrie, Cleveland Heights, Jack F. Shannon, Euclid, and Michael Panich, Mayfield Heights, Ohio, assignors to Bailey Meter Company, a corporation of Delaware Application January 4, 1954, Serial No. 402,124

5 Claims. (Cl. 137—85)

Our invention relates to control systems operable automatically or manually to maintain substantially constant any desired electrical, thermal, chemical, physical or other variable condition through the control of a corrective agent or agents. More particularly, our invention relates to control systems wherein a fluid pressure is utilized as the motive power for actuating devices to control the rate of application of corrective agents.

It is frequently necessary that a system be provided for regulating the supply of an agent affecting a condition, and the system should be operable either automatically in response to the condition for maintaining it at a desired constant value, or manually for varying the condition as desired. The supply of the agent may be controlled by a device which is operated by fluid delivered as a pressure regulated by the system. When the system is switched from automatic to hand control, or vice versa, a pressure supplied to the device immediately after the switch-over should be the same as the pressure supplied before the switch-over was made, otherwise an operation of the device may be obtained to vary the agent so as to upset the whole system. It is therefore desirable that means be provided for regulating the pressure that will be supplied as well as for indicating the various pressures involved. The indication of the various pressures should be at the control station where the automatic-manual switch is made and they should be in such interrelation that desirable comparisons may be made between the incoming pressure and the outgoing pressure as well as intermediate transfer values, and the like.

In systems of this type it is usual to provide a measuring controller for the variable to be controlled, a manual-automatic selector station and a regulating device (such as a valve) for the agent. These three basic devices may be physically located adjacent one another or may be widely separated; due to conditions encountered or the desire of the purchaser.

Fluid pressure telemetering is known wherein a fluid pressure is developed continuously bearing a relation to the value of the variable or to the extent and direction of departure of the value from desired standard or set point. Such a measuring-controller is a transmitter which may be indicating and recording and may preferably be located adjacent the desirable point of measurement of the variable, for many reasons. The fluid loading pressure is transmitted to the control valve for positioning the same, and the transmitter and valve may be widely separated. Intermediate the two is a manual-automatic selector station which may be conveniently located upon a control panel, with other measuring and controlling instrumentalities at a central location, under observation of an operator.

In such a system it has been usual to provide the measuring-controller (transmitter) with proportional band or sensitivity adjustability, as well as with set point or standard setting adjustability. But, if the transmitter is located far from the operator he is unable to observe, or change, these adjustments.

A principal object of our present invention is to provide a fluid pressure system of the type described with proportional band and set point adjustment possibilities remote from the transmitter and even remote from each other if desired; preferably the two adjustments may be convenient to the operator.

Furthermore, the operator should have before him a continuous indication or record of the actual value of the variable as well as of the remotely chosen set point value to observe the effectiveness of the regulation at all times. It is therefore a further object of our invention to provide apparatus of this nature.

Another object of the invention is to provide an improved manual-automatic selector station incorporating remote set point adjustability and indication, as well as various pressure indications of the system in readily comparable relation. To provide an improved system in which a valving mechanism is selectively operative for supplying fluid pressure from automatic or manual control means to a regulating device, and separate gages are provided for indicating the various fluid pressures.

A further object is to provide, in connection with an improved selector station for selectively effecting either manual or automatic control, a grouping of gages indicating the various fluid pressures for visual guidance at transition in order to reduce the magnitude of any pressure differential which otherwise might be detrimental.

Is it also sometimes desired to provide the control station with a bias or modifying control which allows a modification of the outgoing control pressure in relation to the incoming loading pressure while the selector switch is on automatic position. This principle is particularly useful where two power units of different rating are to be operated by a single control pressure. In this case one power unit may be biased at a higher or lower control pressure than the other unit so that both power devices would be permitting equal flow of fuel, air, gas, etc. to a furnace fired vapor generator installation, for example.

A further object is to provide a fluid pressure selective station having means for adjustably biasing the incoming loading pressure fluid to produce an outgoing control fluid pressure a predetermined fixed amount above or below the value of the incoming pressure. The adjustable means providing for varying the fixed bias amount between the incoming and outgoing at all rates of output.

A particular object is to provide an improved selector station for fluid pressure control systems, for selectively effecting either manual or automatic control. In such an improved selector station of our present invention are incorporated fluid pressure relay mechanisms for manually establishing fluid loading pressures, fluid set point pressures, and biased fluid loading pressures. A particular object of the present invention is the structure and functioning arrangement of such new and improved relay mechanisms.

Other objects will appear in the course of the following description.

In the drawing:

Fig. 1 diagrammatically illustrates a fluid pressure measuring and controlling system embodying the invention.

Fig. 2 is a tabulation of valve positions in connection with Fig. 1.

Fig. 3 is a side elevation, partially in section, of a fluid pressure selector station.

Figs. 4 and 5 are sectional views of one of the shut-off valves of Fig. 3, in closed and opened positions respectively.

Fig. 6 is a rear view of the front plate of the selector station, taken along the line 6—6 of Fig. 3, in the direction of the arrows.

Fig. 6A is a detail of a portion of Fig. 6.

Fig. 7 illustrates a portion of Fig. 6 in an alternate position of operation.

Fig. 8 is a longitudinal sectional elevation of a relay for incorporation in a selector station of Fig. 3.

Fig. 9 is an end elevation of the relay of Fig. 8 taken along the line 9—9, in the direction of the arrows.

Fig. 10 is an opposite end elevation of Fig. 8 taken along the line 10—10, in the direction of the arrows.

Fig. 11 is an explanatory diagram of the relay of Fig. 8.

Figure 12:
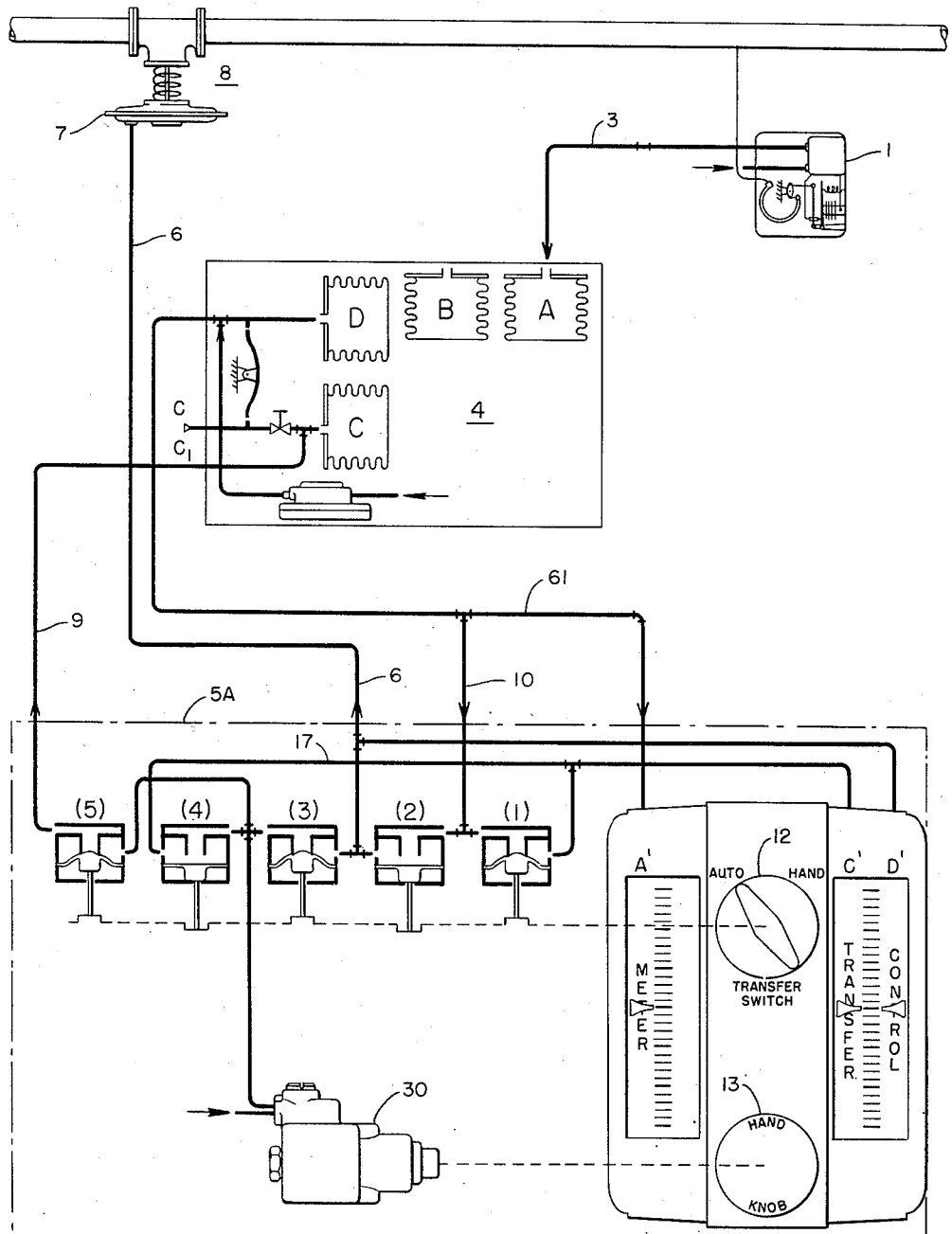

Fig. 12 diagrammatically illustrates a fluid pressure measuring and controlling system embodying the invention, somewhat similar to Fig. 1, but with modifications.

Figure 13:
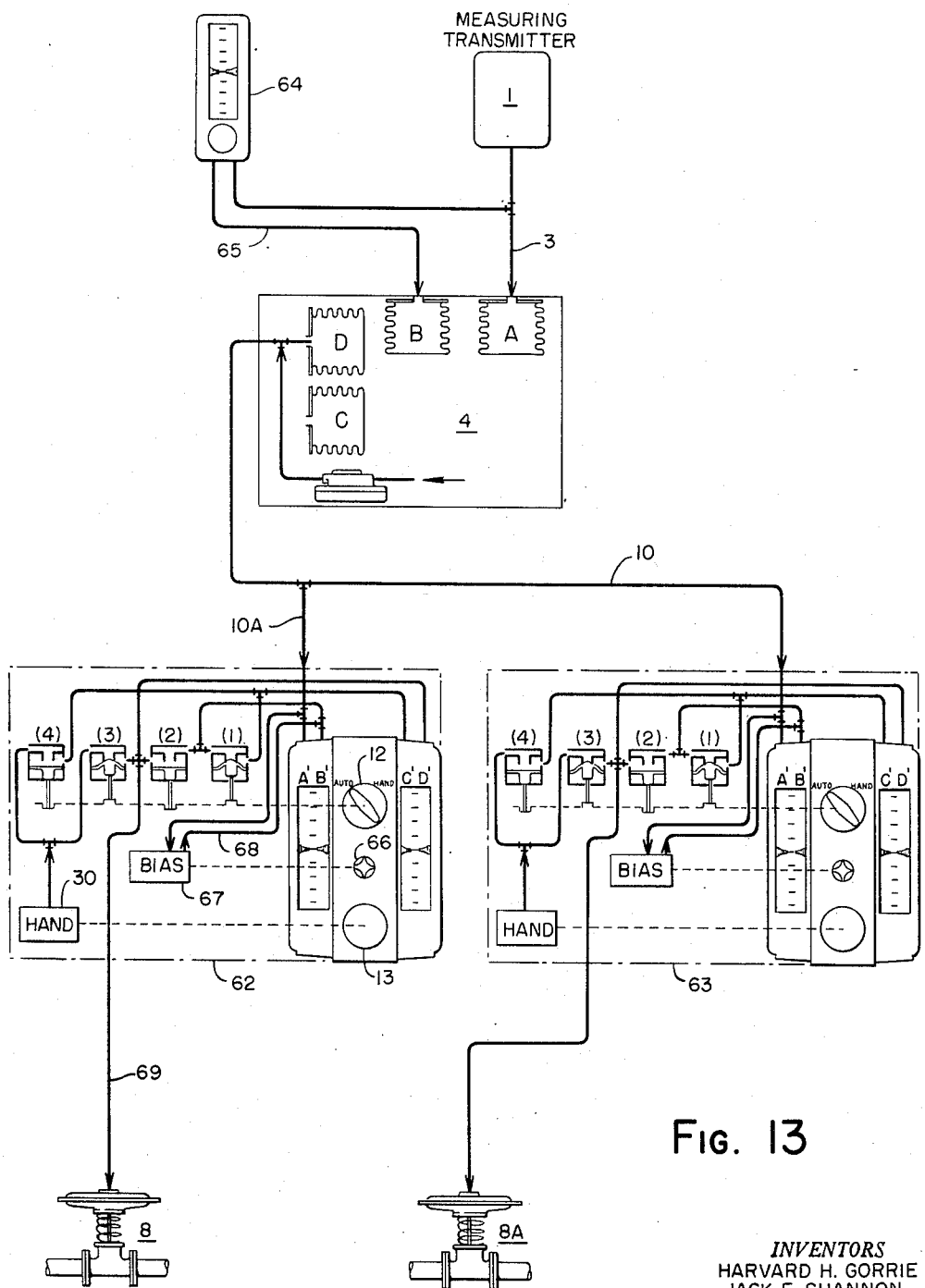

Fig. 13 diagrammatically illustrates a further modification in fluid pressure measuring and controlling systems embodying the invention.

Figure 14:
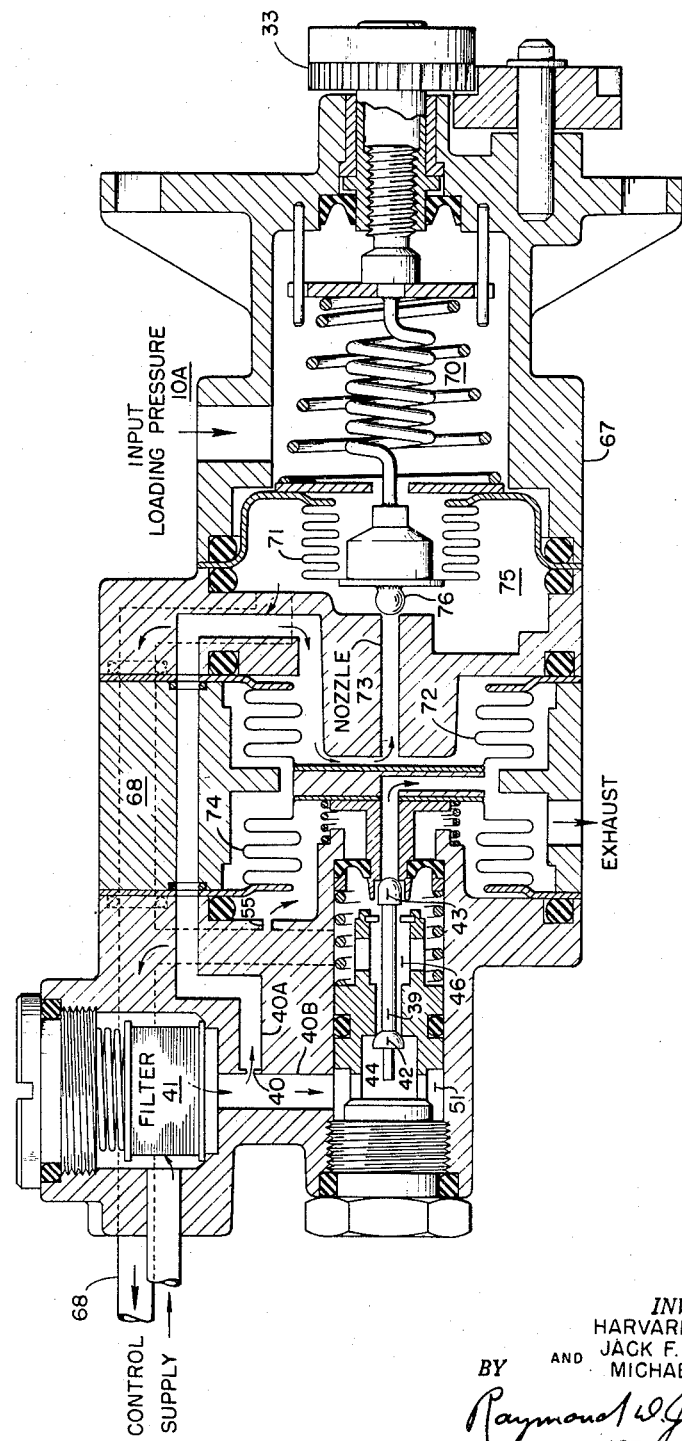

Fig. 14 is a longitudinal sectional elevation of a bias relay, such as is used in the system of Fig. 13, and taken along the line 14—14 of Fig. 15, in the direction of the arrows.

Fig. 15 is a plan view of the relay of Fig. 14.

Fig. 16 is an explanatory diagram of the bias relay of Fig. 14.

Referring now to Fig. 1, we show therein, quite diagrammatically, a simple fluid pressure control system in which a measuring-controlling transmitter 1 is continuously sensitive to the value of a variable such as fluid pressure within the conduit 2 and continuously establishes in a pipe 3 a pneumatic fluid pressure within a range 5–25 p. s. i. proportionately representative of some range of values of the variable. Such a range may be a range of zero to maximum expected value, or a suppressed range within the confines of such extremes. The pipe 3 joins a pneumatic relay 4 and a manual-automatic selector station 5. A pipe 6 communicates between the selector station 5 and the diaphragm 7, of a valve 8, controlling the variable (fluid pressure within the conduit).

Due to the limitation in space of the present drawing sheet, and the desire to have the components 1, 4 and 5 shown to as large a scale as possible, it is not feasible to accentuate the possibility of distance between the elements 1, 4, 5 and 8. It will, however, be appreciated that, in view of our present invention, the transmitter 1 is preferably located immediately adjacent the desired point of pressure measurement for the conduit 2 to minimize measuring piping, lag in measurement, etc. The location of the valve 8 is fixed by design of the plant and may be at a considerable distance from the measuring point 1. Preferably, the relay 4 and the selector station 5 are located relatively close to each other and at a central panel board under the observation of an operator. It is, therefore, apparent that the elements 1, 4, 5 and 8 may be any or all in juxtaposition or may be all widely separated from each other. Through the agency of our present invention it is possible to locate these various elements as desired and still retain the desired interrelation in operation with most efficient observation and adjustability by the operator.

As previously mentioned, it is known to usually provide the measuring-controlling transmitter 1 with set point and proportional band adjustments; but they may then be completely inaccessible to the operator. We thus provide that these adjustabilities be available in the devices 4 and/or 5 as will be pointed out hereinafter. By removing set point or proportional band adjustments from the transmitter 1 we preferably use therein a pressure establishing mechanism of the type illustrated and claimed in the copending application of Gorrie et al. S. N. 289,402, now Patent 2,737,963. It is provided with a nozzle-baffle couple and a booster relay, and is arranged to continuously establish in the pipe 3 a pneumatic fluid loading pressure within the range 5–25 p. s. i. g. proportionately representative of the expected range of pressure within the conduit 2. In other words, the 5–25 p. s. i. g. range of air pressure within the pipe 3 may represent 0–200, 0–1000, 200–300, or other selected range of pressure within the conduit 2 and under adjustability of the mechanism within the transmitter 1 in known manner.

The basic relay type is disclosed and claimed in the copending application of Harvard H. Gorrie S. N. 311,098, now Patent 2,776,669 and is provided with proportional band or sensitivity adjustments which are arranged for manual manipulation. The B bellows is adapted to receive a remotely established set-point loading as will be explained. The A and B chambers of the relay position linkage which carries a flapper. The C and D chambers cooperate a nozzle with the flapper. The nozzle pressure regulates the output of a booster relay upon which depends the output of the relay. The amount of restraint on the flapper movement, manually manipulated, determines the sensitivity between relay input and output.

We have indicated that the pipe 3 is branched as at 3A to enter the selector station 5. Additionally, the selector 5 is joined by pipes 9, 10 and 11, all having arrows indicating the direction of application of the fluid pressures therein. For instance, pipes 3A and 10 transmit pneumatic pressures to the device 5 while pipes 9, 6 and 11 transmit pneumatic pressures from the device 5. It will be seen that, in general, the measurement pressure in pipe 3A enters the device 5 while the control pressure in pipe 6 passes from the device 5 to actuate or position the valve 8.

Pressure within the pipe 3A is continuously indicated by the A' scale pointer on the face of the selector station and thus the value of the variable (pressure within pipe 2) is continuously indicated upon selector scale A'. At the same time pipe 3 joins a comparison indicator 12A which may conveniently be located at any remote spot and shows in comparison the instantaneous value of the variable as well as the remotely established set point value desirable to be maintained.

The device 5 provides selective possibilities and when the transfer knob 12 is in "automatic" position, then the loading pressure in pipe 3, acting through the relay 4, and in conjunction with the selector 5, is passed to the pipe 6 for impression upon the diaphragm 7 and regulation of the valve 8. When it is desired to place the control of the valve under "hand" domination from the location 5, it is possible to turn the knob 12 to its "hand" position and thereafter control the pressure in the pipe 6 by means of a "hand" control knob 13. Under "hand" or "automatic" operation the value of the control pressure in pipe 6 is shown by pointer D' on the face of the selector station. Two other comparison pointers B' and C' are shown and their use will be mentioned hereinafter. The pointers for indicating the various fluid pressures A', B', C' and D' may be actuated by Bourdon tubes sensitive to the fluid pressures, and the mechanisms may be like those of the copending application of T. A. Green et al. S. N. 176,382, now abandoned.

Before proceeding to describe the actual mechanism, and its operation, of the selector station 5, we would point out that the knob 12, on the face of the station 5, allows selectivity between "hand" and "automatic" control of the valve 8. Under "hand" selectivity the knob 13 allows an increase or decrease in control pressure within the pipe 6. A third knob 14 is provided through whose agency is established a fluid loading pressure representative of desired set point which leaves the device 5 through the pipe 11 to enter the relay 4. This pressure value is shown by the position of pointer B' in interrelation to the actual meter value representation of pointer A'. In other words, if the value of the variable within the conduit 2 is as desired, namely, the same as the set point value, then the pointers A' and B' will indicate the same value on the common scale or index therebetween. The same condition would exist on the double pointer remote indicator 12A.

Actuation of the selector transfer knob 12 manually between the "hand" and the "automatic" positions thereof effectively opens or closes fluid pressure valves, and the valves, along with the mechanism for positioning them, will now be explained in connection with Figs. 3, 4 and 5. The desired operation is to actuate these fluid pressure valves definitely to an open or closed position without allowing the mechanism to come to rest in any intermediate position. Thus, toggle-like or notching mechanism is provided for insuring a positive positioning of the movable portions of the valves from one extreme to another representative of "hand" and "automatic" position.

Fig. 1 shows that there are five valves in the selector station and their positions under "hand" and under "automatic" selectivity is shown in Fig. 2. The five valve assemblies are alike and Fig. 3 shows that they are suspended from a rigid member 15 in a somewhat staggered relation so that two of the valves have their stems projecting along side of a square shaft 16 while the remaining three valves have stems projecting downwardly along the other side of the square shaft 16. The shaft 16 is pivoted at its ends to the framework of the selector station 5 and is adapted to be angularly moved about 45° either way from a central position, as is illustrated in Figs. 4 and 5. In the Fig. 4 position of the shaft 16 the valve illustrated is closed while in Fig. 5 the valve is open. Referring now to Fig. 4 it will be seen the valve (2) is shown as having its stem 18 released from the effect of the square shaft 16 and thus urged by the spring 19 upwardly so that the relatively soft valve 20 seats as at 21 closing off any connection between pipes 6 and 10 (Fig. 1).

When the square shaft 16 is turned approximately 90° to its alternate position then the condition of Fig. 5 is shown wherein the valve stem 18 is pulled downwardly against the action of spring 19 and communication is effected between pipes 10 and 17. Thus, the various valves of the selector station 5 are spring urged to close and are opened by angular positioning of square shaft 16 to one or the other of its alternate positions.

The mechanism for positively positioning the shaft 16 to one or the other of its alternate positions is accomplished by a throw-over spring arrangement depicted particularly in Figs. 6 and 7.

The throw-over mechanism is shown in "hand" position in Fig. 6 and in "automatic" position in Fig. 7. Reference to Fig. 3 shows that the transfer knob 12 is in hand position corresponding to Fig. 1 and thus valve (2) is closed as well as valve (4) while valves (1), (3) and (5) are open. Transfer knob 12 is arranged to angularly position a member 21A to either of alternate positions limited by stops 22. Carried by one end of the member 21A is a spring assembly 23 arranged to vary its compressibility as it is moved past the center of square shaft 16 to the position of Fig. 6 or that of Fig. 7. Pivotally moved by the other end of member 21A is a lever arm 24 whose other end is arranged to swing the square shaft 16 to its alternate positions. Thus Figs. 3 and 6 show the mechanism in "hand" position and, if the transfer knob 12 is moved toward its "automatic" position (Fig. 1), as the pivot 25 between the elements of 21A and 23 passes the center line of the knob 12 and the shaft 16 the spring assembly will throw-over and positively position the shaft 16 and the valves to the alternate position shown in Fig. 7. There is therefore no possibility of the various valves of station 5 being left in some intermediate position between completely open and completely closed and the hand transfer knob 12 comes to rest definitely in one or the other of its alternate possible positions.

In Figs. 6 and 6A we have shown the manner in which the selector station 5 is positioned in a mounting panel and fastened thereto. The dot-dash line 26 of Fig. 6 is the cutout or opening made in a mounting panel which may be, for example, ⅛ in. steel plate. All portions of this selector station (Fig. 3) except the face plate 27, may be passed through the opening 26 from the front of the board, until the back edge of the face plate 27 seats against the face of the panel board to a greater dimension than the dimension of cut-out 26. Fig. 6 shows in solid line the rear edge of the face plate 27 and in dot-dash line the expected cut-out in the panel. Fig. 6A is the upper right hand corner of Fig. 6 as though a panel having a cut-out 26A were in proper position.

As the selector station 5 is moved through the cut-out 26 until its outline engages the face of the panel board, four corner screws are turned, each moving an engaging clip 28 from the position shown in Fig. 6 to the position shown in Fig. 6A, limited by a stop 29, and engaging one corner of the clip 28 over that portion of the panel board 26A and the rear engaging edge of the face plate 27. Thus the selector station 5 is locked to the panel board at each of its four corners by the clips 28 as shown in Fig. 6A.

Referring to Fig. 1 it will be seen that the hand knob 13 is arranged to actuate a relay 30 while the set point knob 14 is arranged to actuate a relay 31. The relays 30, 31 are each of the type illustrated in Figs. 8, 9, 10 and 11 and the relay 30 is shown in partial outline in Fig. 3 as having a movable part positionable by knob 13 through the agency of a shaft 32 and gears 33. Inasmuch as the selector station 5 of Figs. 1, 2, 3 is illustrated and described as a set point selector with a third knob 14 for remotely establishing a fluid pressure set point by the relay 31 it will be understood that the assembly of Fig. 3 also includes the relay 31 in addition to the relay 30. Relay 31 would appear beyond the relay 30 and inasmuch as the two relays are similar it seems unnecessary to show more than one relay 30 in Fig. 3. Thus, it will be understood that the set point knob 14 is arranged to position the relay 31 (not shown) through the agency of a shaft 35 and the necessary gears similar to 33.

In general, the knob 13 is arranged to actuate the relay 30 establishing an output loading pressure in a pipe 36, while the knob 14 actuates the relay 31 establishing a set point fluid loading pressure in the pipe 11. As the function of each of the relays 30, 31 is the same, namely, to provide means for manually establishing and varying an output fluid loading pressure in the pipe 36 or 11 respectively, it is only necessary to describe one of the relays and relay 30 is taken as exemplatory.

In Fig. 11 the relay of Figs. 8, 9 and 10 is shown in explanatory diagrammatic form and the operation of the relay will be explained in connection with Fig. 11 although the same reference numerals will be applied to Figs. 8, 9 and 10 which depict the more commercial form. The unit includes a loading spring 37 whose compression is determined by the hand actuated gear 33, a control bellows 38 which balances the compression of the loading spring, an inlet-exhaust valve assembly 39, and a bleed orifice 40. Supply air enters the unit through an air filter 41 and passes to the orifice 40 and to the inlet valve 42. The air, through the orifice, is transmitted to the interior of the control bellows 38 and leaks to atmosphere through an exhaust valve 43 at a rate depending upon the setting of the loading spring.

Fig. 11 solves the difficult problem of clarifying the actual structural operation of the commercial embodiment of Fig. 8. This schematic showing is easily followed, particularly with the use of criss-cross hatching for chamber 46. This hatching serves the purpose of insuring the appreciation of an observer of the uniformity of the pressure established in the complex chambers comprising, and adjacent to, chamber 46.

In balance condition, the pressure drop across the orifice 40 is such that the pressure in the control bellows 38 balances the force exerted by the loading spring 37. An increase in spring loading compresses the control bellows and pushes the exhaust valve seat to the left. The exhaust valve and the inlet valve possess a common stem 39 and the entire assembly is pressure loaded toward the closed position by the action of supply air pressure upon the head 42 of the inlet valve. Motion of the exhaust valve seat to the left closes the exhaust valve and then moves the valve assembly to the left, opening the inlet valve.

Supply air flows through the inlet valve, increasing the control pressure in chamber 46 and bellows 38 and in the output control pressure pipe 36, the control bellows expands moving the exhaust valve seat and valve assembly to the right towards their original positions. When this restoring motion is sufficient to close the inlet valve, the control pressure stops increasing and is maintained at the new value proportional to the higher loading spring compression.

A decrease in spring loading reverses the above operation. The control bellows 38 expands, increasing the exhaust valve opening. Control pressure decreases through the exhaust valve until it reaches a value proportional to the decreased spring loading. Thus the control pressure within bellows 38 and in output pipe 36 is continually determined by the loading of spring 37 through the agency of gears 33 and hand knob 13. In similar manner the output control pressure or set point pressure in pipe 11 is continually determined by loading of the loading spring in relay 31 through the agency of the set point knob 14 and shaft 35.

Relay 30 is primarily designed to establish, and maintain, in output pipe 36 a control pressure of a value determined by a manually adjusted loading spring 37; the controlled pressure to be used in dead end systems rather than in bleed or loss systems. Air at a pressure of 30 p. s. i. is supplied to the relay which functions in general as a pressure reducing valve in establishing an output control pressure within the range 5–25 p. s. i.

Pressure reducing valves are normally of two forms. If the reduced pressure air is supplied as a flow of variable usage then no exhaust valve is needed. An inlet valve is positioned responsive to the force of the loading spring and the pressure differential between supply pressure and output pressure.

If the reduced pressure air is supplied to a dead end system such as a diaphragm chamber or bellows and, neglecting pipe leakage, the relay must have a supply and exhaust couple to be able to both raise and lower the control pressure.

Referring now to Fig. 11 consider that pipe 40A is plugged or closed off and we have a somewhat conventional relay for a dead end system, with all of its inaccuracies and undesirable features. Assume supply pressure constant at 30 p. s. i., valves 42 and 43 of equal area and both seated, and that pipe 36 connects to a leak free dead end system. Air trapped in chamber 46 and pipe 36 is at a control pressure established by the compression of loading spring 37. Theoretically, the value of the control pressure should remain constant indefinitely, or until the loading of spring 37 is manually changed.

However:

(1) The control pressure may gradually decrease through leakage.

(2) The control pressure may increase or decrease through ambient temperature changes.

(3) The supply pressure may change.

These possibilities result in a "dead-band" which previous relays have been unable to overcome. A considerable departure in output control pressure must occur, or build up, before the relay takes steps to correct the depature. A pressure differential of about 30 p. s. i. exists between chambers 44 and 45 tending to hold supply valve 42 and exhaust valve 43 closed. The pressure in chamber 46 opposes spring 37. Under balance condition the various forces are in equilibrium. If any one of the forces is varied the balance is disturbed. A gradual decrease in pressure within chamber 46 must progress far enough so that, not only is the balance between bellows 38 and spring 37 upset, but also for the spring to overcome the pressure differential acting to hold valve 42 closed. This progress time is the "dead band" control pressure change which must take place before correction of control pressure begins. Variations in supply pressure accentuate the dead band through varying the pressure which is loading valve 42.

Through the agency of our present invention, this dead band action or time lag is minimized.

We provide at 39 a floating, pressure loaded, supply and exhaust valve assembly having a supply valve 42 and an exhaust valve 43. The valve assembly is biased by the pressure differential between the supply pressure in chamber 44 and atmospheric pressure in exhaust chamber 45. This differential of about 25 p. s. i. acts on the head of the valve 42 continually urging the assembly 39 toward the right (Fig. 11) which is toward the inlet and exhaust seats.

A branch pipe 40A, to the supply pipe 40B, includes a fixed bleed orifice 40, and the pipe 40A joins the control pressure chamber 46. The assembly of Fig. 11 is shown in balance condition and, while inlet valve 42 is shown closed, the exhaust valve 43 is slightly open. Sizing of the orifice 40 and spacing of the parts is such that under balance condition, with the desired output control pressure in chamber 46 and pipe 36, as determined by the setting of loading spring 37, the bleed of control chamber pressure through the exhaust valve 43 to the atmospheric chamber 45 is equal to the inflow of supply air through the orifice 40.

In balance condition, the supply pressure holds inlet valve 42 seated. Exhaust valve 43 is slightly open, bleeding control pressure from chamber 46 to atmospheric chamber 45. The pressure drop across orifice 40 is such that air is supplied to chamber 46 at the rate it bleeds past exhaust valve 43. The control pressure in chamber 46 balances the force exerted by the loading spring 37.

Assuming a constant supply pressure, leakage of control pressure from controllers connected to output pipe 36 lowers the pressure in chamber 46 (the same effect as increasing spring pressure) causing the exhaust valve seat to move to the left, decreasing the bleed from chamber 46 through the exhaust valve, allowing control pressure in chamber 46 to build up until the state of balance is again achieved.

Conversely, should ambient changes of the output system cause the output control pressure to slightly increase, this increase within the chamber 46, acting upon the bellows 38, moves the exhaust valve seat slightly to the right thus increasing the bleed to atmosphere from chamber 46 to restore the output control value to desired value as established by the loading spring 37.

Assuming a constant control pressure in pipe 36, variations in supply pressure are almost immediately effective within chamber 46, by way of orifice 40, and effective in positioning the bellows 38 and so changing the exhaust valve bleed opening as to compensate the chamber 46 pressure for variations in supply pressure.

The result of the normally continuous bleed through the orifice 40 to the chamber 46, in accordance with the exhaust through valve 43, is the substantial eliminating of a "dead band" or at least the minimization of such a dead band through providing, under certain circumstances, a "slow band" through which the correction is made, perhaps a little bit slower or more delayed than outside of this band, but at least not a "dead band."

Referring now to Figs. 8, 9 and 10, the more commercial embodiment of our relay, it will be seen that the inlet valve seat is formed on a sleeve member 50, longitudinally positionable in a bore 51, by an adjusting screw 52 acting against a spring 53. The chamber 44, to the left of the inlet valve 42, receives supply of air pressure from the pipe 40B. The control pressure chamber 46, surrounding the valve stem 39 between inlet valve 42 and outlet valve 43, is joined by the pipe 40A leading from the orifice 40 as is a discharge conduit 36 for the output control pressure. The interior of bellows 38 is sealed from the chamber 46 by a flexible diaphragm member 54 and the chamber formed with the interior of bellows 38 is supplied from pipe 36 through a restrictive opening 55 to slow down the effect of pressure changes within the bellows 38 and prevent or minimize buzzing or other fluttering of the movable parts.

Inasmuch as the commercial form of relay 30, shown in Fig. 8, is drawn to approximately twice actual scale, it will be appreciated that the assembly 30 is of a small compact size readily adapted to fit within the selector station assembly of Fig. 3. As the spring 37 may have to oppose a pressure of some 30 p. s. i., and must be small on account of space limitation, it results in a high spring rate which, subjected to sudden and material pressure changes within the bellows 38 might cause the spring-bellows system to hunt or buzz rapidly and for this reason is provided the restrictive opening 35. Appreciation of this problem, and its solution, is a feature of our present invention.

In describing the relay 30, with reference to the selector station of Fig. 3, it will be evident that the manually actuated knob 13 is arranged to vary the loading pressure of spring 37 and thus establish, in the pipe 36 a manually established control pressure for positioning the valve 8, when the selector or transfer switch 12 is in hand position. Similarly, the set point knob 14 may be used to vary the spring loading of relay 31 to establish in its output pipe 11 a set point loading pressure applied to the B bellows of relay 4 for the system.

It will now be evident that the relay of Fig. 12 may be of the hand actuated type with no set point provision and thus would have only the knobs 12, 13 and relay 30. Fig. 12 diagrammatically illustrates a control system for the valve 8, of this type wherein the principal components comprise a measuring transmitter 1, a relay 4, selector station 5A, and a control valve 8. The selector station 5A is shown in the automatic position, and thus the relay 30 is inoperative until, or unless, the transfer switch 12 is turned to "hand" position. The fluid pressure in pipe 3, representative of the metered value, enters the A chamber of relay 4. The output of the relay, available in a pipe 61, is indicated upon the A' scale of the selector and, through pipe 10, enters the selector 5A from which it leaves by pipe 6 to position the valve 8. Alternately the pipe 61 may be broken and capped while a pipe between pipe 3 and pipe 61 causes index A' to give the actual metered value rather than the relayed value.

In Fig. 13 we show a measuring-controlling system including two selector stations 62, 63 of the bias type. The stations are similar so that only station 62 will be described in detail.

To bias a unit or auxiliary is the act of decreasing or increasing by a specific amount the incoming loading pressure and is the equivalent of moving the characteristic curve of the controlled device a predetermined amount upwardly or downwardly to a position parallel therewith.

Bias is sometimes necessary when two auxiliaries are operating in parallel from the same loading pressure source, and it is desirable that either one or the other of the auxiliaries lead or lag the other by a constant differential at all times. For example, a master selector station may be controlling two or more pulverizer coal feeders with the same loading pressure. Each pulverizer branch will be equipped with a bias type selector station so that control pressures to the pulverizers may be biased either negatively or positively to correct for sluggishness, wear, rating, etc. of the pulverizer, so that all coal feeders to a single boiler furnace will ultimately be afforded equal fuel output rate irrespective of the operating characteristics of the particular feeder.

The measuring transmitter 1 establishes a fluid loading pressure in pipe 3 which is subjected upon the A chamber of a simple relay 4 whose output is available in a pipe 10 leading to the relay 63. A branch 10A joins the relay 62 so that the two relays 62, 63 receive the same loading signal in accordance with the measured variable. At 64 we show a manual loader for the possibility of remotely manually establishing a set point loading pressure in pipe 65 which may be subjected upon the B chamber of relay 4 if desired.

Selector 62 provides the possibility of manual or automatic control of the positioning of valve 8, while relay 63 provides similar possibilities for the valve 8A. The system provides the possibility of applying the loading pressure of pipe 10 to both of the valves with one valve biased relative to the other. The selector has a manual-automatic knob 12, a hand control knob 13 for positioning the relay 30, and a knob 66 for positioning a bias relay 67. The bias relay 67 is so constructed as to receive the loading pressure of pipe 10A, bias it positively or negatively, and produce an output control pressure in a pipe 68 which, in automatic position, is supplied by way of a pipe 69 to position the valve 8.

The relay 67 will now be explained in connection with Figs. 14, 15 and 16. The operation is somewhat similar to that of the hand relay 30 previously described. However, the output pressure of the bias unit varies according to variations in incoming loading pressure, rather than remaining constant at a manually controlled value.

The bias unit 67 is shown schematically in Fig. 16. The amount of bias on the unit, i. e., the difference between incoming loading pressure at the pipe 10A and output control pressure at the pipe 68, depends on the tension or compression of the bias loading spring 70. The control pressure, which is applied to the outside of a loading bellows 71, must balance incoming loading pressure plus bias spring loading. The bias is zero when the spring loading is zero and the control pressure is equal to the loading pressure. The spring loading is manually controlled by means of the bias control knob 66 (Fig. 13) acting through the gear 33.

Supply air enters the unit through the air filter 41 and passes through the pipe 40B to the bleed orifice 40 and to the inlet valve 42. The air flows through the orifice 40 and pipe 40A to a nozzle bellows 72 and to the nozzle 73. The pressure in the nozzle bellows 72 is determined by the rate of flow through the nozzle 73.

The nozzle bellows 72 is balanced by a control bellows 74. The control bellows is spring loaded equivalent to 3 p. s. i. so that, at balance, the control pressure is 3 p. s. i. less than the nozzle pressure. This pressure differential allows air to bleed through the nozzle to the control pressure volume 75 surrounding the loading bellows 71. The control pressure is maintained at a constant value by the exhaust valve 43 whose opening is increased or decreased by expansion or contraction of the control bellows 74.

At balance, the nozzle opening and the exhaust valve opening are such that the control pressure is maintained at a value sufficient to balance the incoming loading pressure plus the force exerted by the bias loading spring 70 which may be a combination of compression and tension springs as is shown in Fig. 14, so that the bias may be positive or negative relative to the input loading pressure at 10A. An increase in loading pressure expands the loading bellows 71, moving the baffle 76 closer to the nozzle 73. The flow of air from the nozzle is retarded and the pressure increases in the nozzle bellows 72. The resulting nozzle bellows expansion compresses the control bellows 74, moving the exhaust valve seat toward the left. As the seat moves to the left, it closes the exhaust valve 43 and then pushes the valve stem 39 to the left, opening the inlet valve 42.

Supply air flows through the inlet valve 42, increasing the control pressure and starting a restoring action at the loading bellows and at the control bellows. As the control pressure increases, the loading bellows is compressed, moving the baffle 76 away from the nozzle 73 towards its "at balance" position, and the control bellows expands, moving the exhaust valve seat and the valve assembly to the right toward their original position.

When the control pressure has increased to a value sufficient to balance the bias spring loading plus the new loading pressure, the unit is returned to balance with the inlet valve closed and the nozzle and exhaust valve openings such that the control pressure is maintained at a value equal to the loading pressure plus the bias spring loading.

A decrease in loading pressure reverses the operation of the unit. The loading bellows contracts, pulling the baffle away from the nozzle. The resulting pressure decrease in the nozzle bellows causes the control bellows to expand, increasing the exhaust valve opening. The control pressure decreases through the exhaust valve and then is maintained at the decreased value equal to loading pressure plus bias spring loading.

The criss-cross hatching, employed in Fig. 11, is here likewise employed in Fig. 16 for bellows chamber 74, control pressure volume 75 and connecting pipe 68, to emphasize the uniformity of the pressure of these volumes.

Our improved hand relay 30, previously described, provides a relay substantially eliminating the dead band or prior types and substituting a "slow band." The present automatic or biased type of relay 67 eliminates the dead band present in previous relays of this general service. In prior bias relays both the inlet and exhaust valves were normally cracked with a continual usage of air. Furthermore, they required a much larger bellows to obtain the desired amount of power. In the present instance we have provided an extremely small, compact, unit applicable to inclusion in a selector station although equally useful alone. In such a small, compact, unit there is not sufficient room for the previous large bellows and thus our improvement includes pilot operated mechanism which eliminates the previous dead band, provides sufficient capacity, and counteracts any differential in effective areas. The output pressure in space 75 acts upon the same loading bellows 71 that is also sensitive to the input loading pressure through pipe 10A. Thus the differential between these two pressures, acting on the loading bellows 71, is continually the difference as pre-set by the positive or negative spring loading of the bias loading spring 70.

Under balance condition the baffle 76 is normally open in the position shown on Fig. 16, away from the end of nozzle 73, and with a 30 p. s. i. supply in passage 40B, there is a maximum of 27 p. s. i. output in the pipe 68 thus providing a 3 p. s. i. differential across the loading bellows 71. This normal 3 p. s. i. differential across the baffle 76 is maintained regardless of the relative position of baffle 76 to nozzle 73 but the rate of flow out of the nozzle into space 75 will change to maintain the constant differential desired. Only about +.1 p. s. i. increase in differential across this baffle is necessary to move it throughout its complete movement to a closed position. The unit has a very high capacity for its small size and the use of bellows permits more motion than would diaphragms. The built-in filter 41 and the removable valve assembly of both this relay and relay 30 are highly advantageous to allow changing and cleaning the valve system without changing their adjustment. The relay provides equal speed in both directions although prior relays of this general type do not. The air usage is less than those of known types. The unit is pilot operated to obtain sensitivity without a dead band. As to actual construction the diameter of the nozzle 73 is about 1/16" and the diameter of the baffle ball 76 is about 1/8". The commercial form of the relay shown in Fig. 14 is about twice actual size.

We have illustrated and described our invention in connection with a universally applicable selector station arranged to incorporate one or more of two basic types of relays 30, 67. It will be understood, however, that these relays, either or both, need not necessarily be mounted in such a selector station but may be individually and independently mounted and actuated.

While we have chosen certain preferred embodiments of our invention for illustration and description it will be understood that we do not expect to be limited thereto but only as to the claims in view of the prior art.

What we claim as new, and desire to secure by Letters Patent of the United States, is:

1. A fluid pressure relay comprising a casing divided into three chambers, a first chamber having two exits one comprising a bleed orifice and the other an inlet valve seat, a supply of commercially constant pressure fluid for the first chamber; a second chamber having a rigid wall including the said inlet valve seat and a movable wall such as a diaphragm or bellows and having an exhaust seat aligned with the inlet valve seat, the second chamber having an inlet passage from the bleed orifice, an output control pressure pipe communicating with the chamber; a third chamber having as one wall the said movable wall, an opening exhausting to atmosphere, and a spring loading means for the movable wall, a manual loading means for the spring, and a floating valve stem in the second chamber carrying at one end an inlet valve cooperating with said inlet valve seat and at the other end an exhaust valve cooperating with the said exhaust seat in the movable wall.

2. The relay of claim 1 wherein the three chambers are aligned with the second and third chambers separated by the movable wall whereby the second chamber increases or decreases at the expense of the third chamber when the said wall is moved by variation in force application thereupon.

3. The relay of claim 2 including exteriorly adjustable inlet-exhaust valve seat spacing means.

4. A fluid pressure relay of the biased type having a pair of pressure chambers with a common movable wall, one of the chambers receptive of a variable input loading pressure, the other chamber receptive of relay output control pressure, manually loadable spring means for the movable wall, whereby the said wall is positioned responsive to pressure differential of the two chambers and the bias loading spring means; a nozzle baffle positioned in the second chamber by the movable wall relative to a nozzle entrance to that second chamber, a supply of commercially constant pressure fluid to the assembly; a third chamber having a movable wall, supplied with pressure fluid from said supply through a fixed bleed orifice and discharging through said nozzle at a flow rate regulated by baffle position, a fourth chamber having a spring loaded movable wall also acted upon by the movable wall of the third chamber and having a combined supply valve and exhaust valve assembly including an inwardly facing valve seat member projecting within said fourth chamber, an aligned outwardly facing valve seat in the opposite wall, an elongated valve stem member having a supply valve on the end adjacent said opposite wall and an exhaust valve on the end adjacent the valve seat member projecting within said fourth chamber, and conduit means communicating the second and fourth chambers with an output control conduit, whereby the relay output control pressure is made linearly proportional to the variable input loading pressure.

5. A fluid pressure relay of the biased type having a pair of pressure chambers with a common movable wall, one of the chambers receptive of a variable input loading pressure, the other chamber receptive of relay output control pressure, manually loadable spring means for the movable wall, whereby the said wall is positioned responsive to pressure differential of the two chambers and the bias loading spring means; a nozzle baffle positioned in the second chamber by the movable wall relative to a nozzle entrance to that chamber; a supply of commercially constant pressure fluid to the assembly; a third chamber having a movable wall, supplied with pressure fluid from said supply through a fixed bleed orifice and discharging through said nozzle at a flow rate regulated by baffle position; a fourth chamber having a spring loaded movable wall also acted upon by the movable wall of the third chamber, the four chambers being aligned and the first and second chambers increase or decrease at the expense of each other and the third and fourth chambers increase or decrease at the expense of each other, and the said fluid pressure relay includes exteriorly adjustable inlet-exhaust valve seat spacing means, an inlet and exhaust valve assembly cooperating with a supply inlet in a fixed wall and an exhaust outlet in the movable wall in development of the relay output control pressure, and pipe means communicating the second and fourth chambers with an output control conduit, whereby the relay output control pressure is made linearly proportional to the variable input loading pressure.

References Cited in the file of this patent

UNITED STATES PATENTS

| Number | Name | Date |
|---|---|---|
| 2,202,485 | Fitch | May 28, 1940 |
| 2,223,356 | Krogh | Dec. 3, 1940 |
| 2,227,258 | Hilmer et al. | Dec. 31, 1940 |
| 2,369,887 | Eckman | Feb. 20, 1945 |
| 2,431,297 | Moore | Nov. 18, 1947 |
| 2,461,026 | Bilyeu | Feb. 8, 1949 |
| 2,505,981 | McLeod | May 2, 1950 |
| 2,517,051 | Swenson | Aug. 1, 1950 |
| 2,638,875 | Bowditch | May 19, 1953 |
| 2,638,921 | Caldwell | May 19, 1953 |
| 2,731,024 | Williams | Jan. 17, 1956 |
| 2,751,918 | Higgins | June 26, 1956 |

UNITED STATES PATENT OFFICE
Certificate of Correction

Patent No. 2,834,362　　　　　　　　　　　　　　　　　　　May 13, 1958

Harvard H. Gorrie et al.

It is hereby certified that error appears in the above numbered patent requiring correction and that the said Letters Patent should read as corrected below.

In the drawings, Sheet 3, Fig. 5, for "(1)" read —(2)—; same Fig. 5, for reference number "17" read —6—; Figs. 6 and 7, a slot should appear in the upper end of lever arm 24 to accommodate the projecting pin of member 21A in the movement of the lever arm 24 and member 21A from their Fig. 6 positions to their Fig. 7 positions, or vice versa; in the printed specification, column 5, line 21, for "45°" read —15°—; line 31, for "90°" read —30°—; line 35, for "17" read —6—; line 55, after "24" insert —whose upper end is slotted to accommodate a projecting pin of member 21A and—; column 7, line 66, for "depature" read —departure—; column 9, line 17, for "35" read —55—.

Signed and sealed this 18th day of November 1958.

[SEAL]

Attest:
KARL H. AXLINE,
Attesting Officer.

ROBERT C. WATSON,
Commissioner of Patents.